United States Patent
Määttanen (10) Patent No.: US 11,570,585 B2
(45) Date of Patent: *Jan. 31, 2023

(54) METHODS, USER EQUIPMENT AND RADIO NETWORK NODE FOR MULTIMEDIA BROADCAST MULTICAST SERVICE

(71) Applicant: Telefonaktiebolaget LM Ericsson (publ), Stockholm (SE)

(72) Inventor: Helka-Liina Määttanen, Helsinki (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 50 days.

This patent is subject to a terminal disclaimer.

(21) Appl. No.: 17/173,689

(22) Filed: Feb. 11, 2021

(65) Prior Publication Data

US 2021/0168566 A1 Jun. 3, 2021

Related U.S. Application Data

(63) Continuation of application No. 15/758,128, filed as application No. PCT/SE2017/051207 on Dec. 4, 2017, now Pat. No. 10,945,099.

(Continued)

(51) Int. Cl.
*H04W 4/06* (2009.01)
*H04W 4/90* (2018.01)
(Continued)

(52) U.S. Cl.
CPC .............. *H04W 4/06* (2013.01); *H04W 4/90* (2018.02); *H04W 68/02* (2013.01);
(Continued)

(58) Field of Classification Search
CPC ......... H04W 4/06; H04W 4/90; H04W 76/50; H04W 68/02; H04W 72/005; H04W 72/042
See application file for complete search history.

(56) References Cited

U.S. PATENT DOCUMENTS

| | | | |
|---|---|---|---|
| 2014/0086173 A1 | 3/2014 | Sadeghi et al. | |
| 2014/0134970 A1* | 5/2014 | Pazos | H04M 3/00 455/404.1 |

(Continued)

FOREIGN PATENT DOCUMENTS

| | | |
|---|---|---|
| CN | 101137218 A | 3/2008 |
| CN | 104798390 A | 7/2015 |

(Continued)

OTHER PUBLICATIONS

International Search Report and Written Opinion issued in Application No. PCT/SE2017/051207 dated Feb. 8, 2018, 15 pages.

(Continued)

*Primary Examiner* — Mewale A Ambaye
(74) *Attorney, Agent, or Firm* — Rothwell, Figg, Ernst & Manbeck, P.C.

(57) ABSTRACT

A method and a user equipment as well as a method and a radio network node for multimedia broadcast service are disclosed. The radio network node sends, on a physical downlink control channel of the carrier, downlink control information using a multicast network identifier. The downlink control information includes a bit indicating whether or not at least two emergency notifications are broadcast on the carrier, and a notification relating to a change of a multicast channel of the carrier. The user equipment receives, on a physical downlink control channel of the carrier, downlink control information using a multicast network identifier. The user equipment behaves as if at least two fields relating to indication of said at least two emergency notifications are set to one in a paging message for the user equipment, when the information satisfies a condition.

17 Claims, 3 Drawing Sheets

Related U.S. Application Data (60) Provisional application No. 62/454,087, filed on Feb. 3, 2017.

(51) Int. Cl.
    *H04W 76/50*     (2018.01)
    *H04W 68/02*     (2009.01)
    *H04W 72/00*     (2009.01)
    *H04W 72/04*     (2009.01)

(52) U.S. Cl.
    CPC ....... *H04W 72/005* (2013.01); *H04W 72/042* (2013.01); *H04W 76/50* (2018.02)

(56) References Cited

U.S. PATENT DOCUMENTS

| | | | |
|---|---|---|---|
| 2015/0146604 | A1 | 5/2015 | Kim et al. |
| 2015/0195696 | A1 | 7/2015 | Shukla et al. |
| 2015/0249912 | A1 | 9/2015 | Lee et al. |
| 2016/0127439 | A1 | 5/2016 | Ginnela et al. |
| 2016/0192327 | A1 | 6/2016 | Yi et al. |
| 2016/0205661 | A1* | 7/2016 | Ryu .............. H04W 68/02 455/458 |
| 2016/0227602 | A1* | 8/2016 | Yi ................. H04W 76/15 |
| 2016/0234735 | A1* | 8/2016 | Kubota ............. H04W 48/14 |
| 2017/0105166 | A1 | 4/2017 | Lee et al. |
| 2017/0164407 | A1 | 6/2017 | Yang et al. |
| 2017/0207924 | A1 | 7/2017 | Lee et al. |
| 2017/0207925 | A1 | 7/2017 | Kim et al. |
| 2019/0254109 | A1* | 8/2019 | Lee .............. H04W 68/00 |
| 2019/0281588 | A1* | 9/2019 | Zhang ............ H04L 5/0051 |
| 2019/0319686 | A1* | 10/2019 | Chen, IV ......... H04W 24/08 |

FOREIGN PATENT DOCUMENTS

| | | |
|---|---|---|
| CN | 106031200 A | 10/2016 |
| EP | 2 536 093 | 12/2012 |
| RU | 2 600 535 | 9/2015 |
| WO | 2013/019155 | 2/2013 |
| WO | 2015/190750 | 12/2015 |
| WO | 2015/199491 | 12/2015 |
| WO | 2016/121538 | 8/2016 |

OTHER PUBLICATIONS

Nokia Corporation, "Adding PWS/CMAS capability to ReI-9 LTE", 3GPP TSG-RAN WG2 Meeting #67, R2-094570, Shenzhen, China, Aug. 24-28, 2009, 15 pages.
Russian Office Action, issued in corresponding Russian Application No. 2019126656, dated Mar. 3, 2020, 8 pages.
International Preliminary Report on Patentability, issued in corresponding International Application No. PCT/SE2017/050687, dated Oct. 29, 2018, (15 pages).
Non-Final Office Action, issued in corresponding U.S. Appl. No. 15/551,614, dated May 30, 2018, (30 pages).
3GPP TS 36.213 V13.2.0 (Jun. 2016), 3rd Generation Partnership Project; Technical Specification Group Radio Access Network; Evolved Universal Terrestrial Radio Access (E-UTRA); Physical layer procedures (Release 13) Jun. 2016, (6 pages).
3GPP TS 36.304 V13.2.0 (Jun. 2016), 3rd Generation Partnership Project; Technical Specification Group Radio Access Network; Evolved Universal Terrestrial Radio Access (E-UTRA); User Equipment (UE) procedures in idle mode (Release 13) Jun. 2016, (46 pages).
3GPP TS 36.321 (Jun. 2016), 3GPP TS 36.321 V13.2.0 (Jun. 2016), 3rd Generation Partnership Project; Technical Specification Group Radio Access Network; Evolved Universal Terrestrial Radio Access (E-UTRA); Medium Access Control (MAC) protocol specification (Release 13) Jun. 2016, (91 pages).
3GPP TS 36.302 V.13.2.0 (Jun. 2016), 3rd Generation Partnership Project; Technical Specification Group Radio Access Network; Evolved Universal Terrestrial Radio Access (E-UTRA); Services provided by the physical layer (Release 13) Jun. 2016, (28 pages).
3GPP TS 36.212 V13.2.0 (Jun. 2016), 3rd Generation Partnership Project; Technical Specification Group Radio Access Network; Evolved Universal Terrestrial Radio Access (E-UTRA); Multiplexing and channel coding (Release 13), Jun. 2016 (140 pages).
3GPP TS 36.331 V13.2.0 (Jun. 2016), 3rd Generation Partnership Project; Technical Specification Group Radio Access Network; Evolved Universal Terrestrial Radio Access (E-UTRA); Radio Resource Control (RRC); Protocol specification (Release 13), Jun. 2016 (623 pages).
Huawei, "Introduction of FeMBMS in 36.212", 3GPP TSG RAN WG1 Meeting #87, R1-1613813, Reno, USA, Nov. 14-18, 2016 (3 pages).
Ericsson, "Revised WID: eMBMS enhancements for LTE", 3GPP TSG-RAN #72, Tdoc RP-161297, Busan, Korea, Jun. 13-16, 2016 (8 pages).
Ericsson et al., "New WID: eMBMS enhancements for LTE", 3GPP TSG-RAN #71, Tdoc RP-160675, Goteborg, Sweden, Mar. 7-10, 2016 (8 pages).
Motorola Mobility, "Introduction of eMBMS enhancements for LTE TO 36.213 Sections 10-13", 3GPP TSG-RAN WG1 Meeting #88, R1-1613815, Reno, USA, Nov. 14-18, 2016 (82 pages).
RAN WG1, "LS on direct indication in DCI format 1C", 3GPP TSG RAN WG1 Meeting #87, R1-1613816, Reno, USA, Nov. 14-18, 2016 (2 pages).
European Communication dated Jun. 16, 2020, issued in European Patent Application No. 17 818 332.4, 9 pages.
3GPP TS 36.331 V13.4.0 (Dec. 2016), 3rd Generation Partnership Project; Technical Specification Group Radio Access Network; Evolved Universal Terrestrial Radio Access (E-UTRA); Radio Resource Control (RRC); Protocol specification (Release 13), Dec. 2016 (9 pages).

\* cited by examiner

METHODS, USER EQUIPMENT AND RADIO NETWORK NODE FOR MULTIMEDIA BROADCAST MULTICAST SERVICE

CROSS-REFERENCE TO RELATED APPLICATIONS

This application is a continuation of Ser. No. 15/758,128, filed on Mar. 7, 2018, which is a 35 U.S.C. § 371 National Stage of International Patent Application No. PCT/SE2017/051207, filed Dec. 4, 2017, designating the United States and claiming priority to U.S. provisional application No. 62/454,087, filed on Feb. 3, 2017. The above identified applications are incorporated by this reference.

TECHNICAL FIELD

Embodiments herein relate to wireless communication systems, such as telecommunication systems, cellular systems and the like. In particular, a method and a user equipment for multimedia broadcast service as well as a method and a radio network node for multimedia broadcast service are disclosed. Corresponding computer programs and computer program carriers are also disclosed.

BACKGROUND

A new work item to enhance Multimedia Broadcast Multicast Service (MBMS) operation was approved in Radio Access Network #71 (RAN#71) in RAN Plenary (RP)-160675 and further revised in RAN#72 in RP-161297 and reads as follows:
The objective of the work item is to evaluate and specify the following enhanced MBMS (eMBMS) enhancements for Long Term Evolution (LTE):
a. Specify means of using a longer cyclic prefix (e.g. greater than 33.33 μs) for use in a mixed unicast/eMBMS carrier for large Single Frequency Network (SFN) delay spread environment (e.g. 15 km or larger inter-site distance), which guarantees coexistence of the legacy and new prefixes on the same carrier, while achieving a spectral efficiency of at least 2 bps/Hz. This objective includes evaluation. (Radio Access Network—RAN, RAN1, RAN4)
b. Specify means of using subframes 0, 4, 5, 9 (frame structure type 1-FS1) and 0, 1, 5, 6 (frame structure type 2- FS2) for Multicast Broadcast Single Frequency Network (MBSFN). (RAN2, RAN1)
   The non-MBSFN subframes for unicast can only be used as Secondary cell (Scell)
c. Specify means of configuring MBSFN subframes without a unicast control region and cell-specific reference signals. (RAN1, RAN2)
Note: Both connected and idle mode further enhanced MBMS (feMBMS) operation are included.
Study the following:
d. Support for standalone carrier with all DL subframes dedicated to MBSFN transmission and self-contained eMBMS signaling including information of System Information Block (SIB)13, SIB15, SIB16. (RAN2).
e. Support for multi-carrier eMBMS/unicast operation involving reception from one or more eMBMS cells that may be non-collocated and asynchronous with one or more cells that are simultaneously used for unicast. (RAN4, RAN2)
f. Solutions where a User Equipment (UE) can receive the Television (TV) transport service without being authenticated (RAN1, RAN2, RAN3)
Specify necessary User Equipment Radio Frequency (UE RF) and Base Station (BS) RF core requirements for new Cyclic Prefix (CP) length, if defined, for eMBMS. (RAN4)
No new Time Division Duplex (TDD) Downlink/Uplink (DL/UL) configuration for FS2 is considered in this Work Item (WI)-
This work will consider the outcome of the corresponding System Architecture workgroup (SA2) work
   The work for eMBMS started in previous RAN1#84bis meeting where the following clarifications concerning objectives b) and c) of the Work Item Description (WID) were concluded:
   Objectives b and c mean that legacy UEs cannot be scheduled on the carrier
   The reason that subframes 0, 4, 5, 9 (FS1) and 0, 1, 5, 6 (FS2) currently cannot be used for MBSFN transmission is that they carry Primary Synchronization Signal (PSS)/ Secondary Synchronization Signal (SSS)/ Physical Broadcast Channel (PBCH) on subframes 0 and 5 (FS1, FS2) and paging channel on subframes 0, 4, 5, and 9 (FS1), 0, 1, 5, and 6 (FS2) with the densest paging configuration. As MBMS allocations are full-bandwidth, i.e. all Physical Resource Blocks (PRBs) are allocated, PSS/SSS/PBCH and paging messages cannot be frequency multiplexed with the Physical Multicast Channel (PMCH). The PSS/SSS and Cell-specific Reference Signal (CRS) in subframes 0 and 5 are used for cell search and time and frequency tracking.
   As specified in Third Generation Partnership Project (3GPP) Technical Specification (TS) 36.304 v13.2.0, the Frequency Division Duplex (FDD) UEs are calculating the Paging Occasions they need to monitor, e.g. when the Paging-Radio Network Temporary Identifier (P-RNTI) is transmitted on Physical Downlink Control Channel (PDCCH) or Narrowband Physical Downlink Control Channel (NPDCCH) or on Machine Type Communicatoin (MTC) Physical Downlink Control Channel (MPDCCH) with system bandwidth >3 MHz, using following table:

| Ns [time unit] | PO when i_s = 0 | PO when i_s = 1 | PO when i_s = 2 | PO when i_s = 3 |
|---|---|---|---|---|
| 1 | 9 | N/A | N/A | N/A |
| 2 | 4 | 9 | N/A | N/A |
| 4 | 0 | 4 | 5 | 9, | where i_s = floor(UE_ID/N) mod Ns, N: min(T, nB), Ns: max(1, nB/T) and nB: 4T, 2T, T, T/2, T/4, T/8, T/16, T/32.

The nB (time value) parameter is configurable by the network and signalled in SIB2 (as part of the pcch-Config Information Element (IE), which in turn is part of the radioResourceConfigCommon IE). It can be noted that by configuring nB<=T it is possible to limit PO occurrences to sub-frame #9 only without having to consider UE_ID or DRX cycle length configured for the UE.
The Evolved-Universal Terrestrial Radio Access Network (E-UTRAN) paging message is defined in 3GPP TS 36.331 v13.2.0. It contains information both about one or more UEs that are being paged with the message, as UE identities, as well as other information that is addressed to many or all UEs. Paging is used to:
   transmit paging information to a UE in Radio Resource Control Idle mode (RRC_IDLE) and/ or;

inform UEs in RRC_IDLE and UEs in Radio Resource Control Connected mode (RRC_CONNECTED) about a system information change and/ or;

inform about an Earthquake and Tsunami Warning System (ETWS) primary notification and/ or ETWS secondary notification and/ or;

inform about a Commercial Mobile Alert System (CMAS) notification and/or;

inform UEs in RRC_IDLE about an Extended Access Barring (EAB) parameters modification and/or;

inform UEs in RRC_IDLE to perform E-UTRAN inter-frequency redistribution procedure.

In MTC work, a Direct Indication information is defined in 3GPP TS 36.331 and conveyed to the UE by Downlink Control Information (DCI) format 6-2 defined in 3GPP TS 36.212.

Table 6.6-1 in 3GPP TS 36.331 v13.2.0 defines the Direct Indication information.
When bit n is set to 1, the UE shall behave as if the corresponding field is set in the Paging message, as described in sub-clause 5.3.2.3 in 3GPP TS 36.331 v13.2.0. Bit 1 is then the least significant bit.

TABLE 6.6-1 of TS 36.331 v13.2.0: Direct Indication information

| Bit | Field in Paging message |
|---|---|
| 1 | systemInfoModification |
| 2 | etws-Indication |
| 3 | cmas-Indication |
| 4 | eab-ParamModification |
| 5 | systemInfoModification-eDRX |
| 6, 7, 8 | Not used, and shall be ignored by UE if received. |

Further, a UE receiving eMBMS service needs to follow eMBMS specific system information given in the Multicast Control Channel (MCCH). The change notification of the MCCH is given in DCI 1C as an 8bit bitmap where each bit corresponds to one MBSFN area. The UE receives the MBSFN area information in the MBSFN-AreaInfoList information element, included in SystemInformationBlock-Type13, where a parameter notificationIndicator describes which bit position in the bitmap corresponds to this MBSFN area.

| MBSFN-AreaInfoList information element |
|---|
| -- ASN1START |
| MBSFN-AreaInfoList-r9 ::=  SEQUENCE (SIZE (1..max-MBSFN-Area)) OF MBSFN-AreaInfo-r9 |
| MBSFN-AreaInfo-r9 ::=  SEQUENCE { |
|   mbsfn-AreaId-r9         MBSFN-AreaId-r12, |
|   non-MBSFNregionLength   ENUMERATED {s1, s2}, |
|   notificationIndicator-r9 INTEGER (0..7), |
|   mcch-Config-r9          SEQUENCE { |
|   mcch-RepetitionPeriod-r9 ENUMERATED {rf32, rf64, rf128, rf256}, |
|   mcch-Offset-r9          INTEGER (0..10), |
|   mcch-ModificationPeriod-r9 ENUMERATED {rf512, rf1024}, |
|   sf-AllocInfo-r9         BIT STRING (SIZE(6)), |
|   signallingMCS-r9        ENUMERATED {n2, n7, n13, n19} |
|   }, |
|   ... |
| } |
| -- ASN1STOP |

The DCI 10 for MCCH change notification is defined in 3GPP TS 36.212 as follows: Else if the format 1C is used for notifying MCCH change Information for MCCH change notification—8 bits as defined in section 5.8.1.3

Reserved information bits are added until the size is equal to that of format 1C used for very compact scheduling of one PDSCH codeword On feMBMS carrier there will be some subframes where at least PSS/SSS and CRS is transmitted even with 100% eMBMS subframe allocation. Any DCI format can be sent to UE in the PDCCH region of these subframes and the PDSCH of these subframes may be used to carry System Information (SI) or unicast information.

RAN1 has agreed to extend the current DCI format 1-C used to indicate MCCH change to also indicate SI change. The corresponding change is agreed to TS 36.212 [R1-1613813] and is reflected also in TS36.213 11.2 [R1-1613815]. However, RAN2 has also agreed to support ETWS and CMAS on this carrier and notifications related to these are also needed. Accordingly, RAN1 is sending Liaison Statement (LS) [R1-1613816] to RAN2 informing it is possible to add bits to DCI format 1C to indicate also ETWS and CMAS change.

SUMMARY

In view of the above, due to the limited available size of the format 1C DCI, it should be noted that the bits for direct indication notification restrict the deployment of eMBMS to wider bandwidths. A field of size {1-2, 3-4, 5, 6, 7} bits requires a deployment of {15, 25, 50, 75, 100} PRBs. Alternatively, the field for direct indication information could be conditionally present only for wider bandwidths.

Regardless of whether the SI, ETWS and CMAS indication is conditionally or mandatory present, it seems that adding all these three bits limits the deployment to 25 PRBs or wider.

An object may be to improve flexibility concerning use of ETWS and/or CMAS.

According to an aspect, the object is achieved by a method performed by a user equipment. The user equipment operates on a carrier configured for multimedia broadcast multicast services. The user equipment receives, on a physical downlink control channel of the carrier, downlink control information using a multicast network identifier. The downlink control information comprises a bit indicating whether or not at least two emergency notifications are broadcast on the carrier, and a notification relating to a change of a multicast channel of the carrier. Furthermore, the user equipment behaves as if at least two fields relating to indication of said at least two emergency notifications are set to one in a paging message for the user equipment, when the bit is set to one.

According to another aspect, the object is achieved by a user equipment configured for operation on a carrier configured for multimedia broadcast multicast services. The user equipment is configured for receiving, on a physical downlink control channel of the carrier, downlink control information using a multicast network identifier. The downlink control information comprises a bit indicating whether or not at least two emergency notifications are broadcast on the carrier, and a notification relating to a change of a multicast channel of the carrier. Furthermore, the user equipment is configured for behaving as if at least two fields relating to indication of said at least two emergency notifications are set to one in a paging message for the user equipment, when the bit is set to one.

According to a further aspect, the object is achieved by a method performed by a radio network node. The radio network node manages a carrier configured for multimedia broadcast multicast services. The radio network node sends, on a physical downlink control channel of the carrier, downlink control information using a multicast network identifier. The downlink control information comprises a bit indicating whether or not at least two emergency notifications are broadcast on the carrier, and a notification relating to a change of a multicast channel of the carrier.

According to a still further aspect, the object is achieved by a radio network node configured for managing a carrier configured for multimedia broadcast multicast services. The radio network node is configured for sending, on a physical downlink control channel of the carrier, downlink control information using a multicast network identifier. The downlink control information comprises a bit indicating whether or not at least two emergency notifications are broadcast on the carrier, and a notification relating to a change of a multicast channel of the carrier.

According to further aspects, the object is achieved by computer programs and computer program carriers corresponding to the aspects above.

Thanks to that one bit, e.g. only one bit, indicates ETWS and/or CMAS change, bandwidth limitation of DCI format 1-C may not be violated, e.g. any bandwidth may be used. The bandwidth limitation of DCI format 1-C is 15 physical resource blocks (PRBs) and if more bits are used, the bandwidth limitation would be 25 PRBs and wider. Due to the bandwidth limitation of DCI format 1-C, it may be considered to indicate SI change with one bit and ETWS or CMAS change with another bit, i.e. a common bit for both ETWS and CMAS. The method of the user equipment may be such that if the UE receives this one bit for SI change notification, it would act as if it has received Paging message including the system InfoModification, e.g. applies the SI message periodicity as currently. If the common bit for ETWS/CMAS is set to 1, UE acts as if Paging message including both ETWS and CMAS notifications has been received and starts receiving ETWS and CMAS notifications according to schedulingInfoList.

An advantage is that it is possible to deploy 15 PRB bandwidth that supports SI change notification and both ETWS and CMAS notifications. With separate bits the bandwidth limitation would be 25 PRBs, i.e. 25 PRBs or greater would be required.

Combining the bits as proposed is beneficial since different handling of SI change notification and ETWS/CMAS notification is expected as explained in the detailed description below.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Throughout the following description similar reference numerals have been used to denote similar features, such as nodes, actions, modules, circuits, parts, items, elements, units or the like, when applicable. In the Figures, features that appear in some embodiments are indicated by dashed lines.

Figure 1:
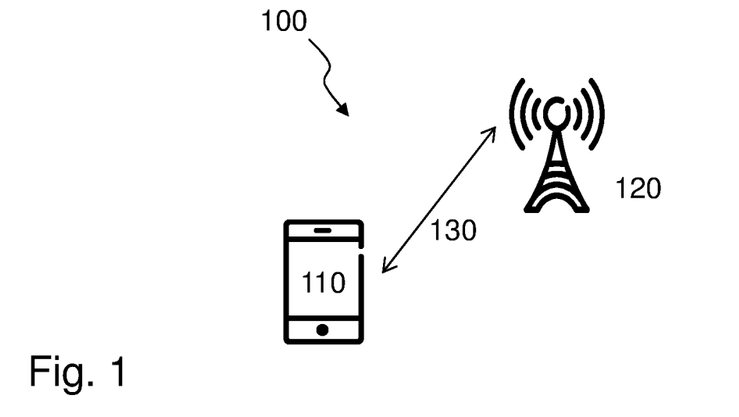
FIG. 1 is a schematic overview of an exemplifying system in which embodiments herein may be implemented.

FIG. 1 depicts an exemplifying wireless communication system 100 in which embodiments herein may be implemented. In this example, the system 100 is an LTE system, or an evolution thereof or the like. As an example, the system 100 may be based on Release-14 according to 3GPP.

In other examples, the system 100 may be any cellular or wireless communication system, such as a Global Mobile-communication System (GSM), Universal Mobile Telecommunication System (UMTS) and Worldwide Interoperability for Microwave Access (WiMAX) allowing a layer of D2D communications or the like.

The wireless communications system 100 may for example be a network such as Long-Term Evolution (LTE), e.g. LTE Frequency Division Duplex (FDD), LTE Time Division Duplex (TDD), LTE Half-Duplex Frequency Division Duplex (HD-FDD), LTE operating in an unlicensed band, or a Wideband Code Division Multiple Access (WCDMA), Universal Terrestrial Radio Access (UTRA) TDD, Ultra-Mobile Broadband (UMB), GSM network, GSM/Enhanced Data Rate for GSM Evolution (EDGE) Radio Access Network (GERAN) network, EDGE network, a network comprising of any combination of Radio Access Technologies (RATs) such as e.g. Multi-Standard Radio (MSR) base stations, multi-RAT base stations etc., any 3GPP cellular network, WiFi networks, Worldwide Interoperability for Microwave Access (WiMax), 5G system or any cellular network or system.

The system 100 may be said to comprise a user equipment 110. This means that the user equipment 110 is present in the system 100.

Furthermore, a radio network node 120 is shown in FIG. 1. The system 100 may comprise the radio network node 120. The user equipment 110 may be in so called idle mode or connected mode with respect to the radio network node 120.

The radio network node 120 may communicate 130 with the user equipment 110, e.g. on a carrier corresponding to a frequency interval. This communication may include user transmissions and/or control transmissions. The user transmissions may include user data, payload data, content data etc. The control transmissions may include control information relating to e.g. scheduling, authentication, mobility, transmit power etc. The user transmissions are only relevant in case the first wireless device is in a cellular mode. The communication may include uplink transmission and/or downlink transmission. A transmission may be referred to as a data block.

As used herein, the term "radio network node" may refer to a Base Station System (BSS), a Radio Network Controller (RNC), a Radio Base Station (RBS), an evolved Node B (eNB), a control node controlling one or more Remote Radio Units (RRUs), an access point or the like.

As used herein, the term "user equipment" may refer to a wireless communication device, a machine-to-machine (M2M) device, a mobile phone, a cellular phone, a Personal Digital Assistant (PDA) equipped with radio communication capabilities, a smartphone, a laptop or personal computer (PC) equipped with an internal or external mobile broadband modem, a tablet PC with radio communication capabilities, a portable electronic radio communication device, a sensor device equipped with radio communication capabilities or the like. The sensor device may detect any kind of metric, such as wind, temperature, air pressure, humidity, light, electricity, sound, images etc. The term "user" may indirectly refer to the user equipment.

Sometimes, the term "user" may be used to refer to the user equipment or the like as above. It shall be understood that the user may not necessarily involve a human user. The term "user" may also refer to a machine, a software component or the like using certain functions, methods and similar.

Figure 2:
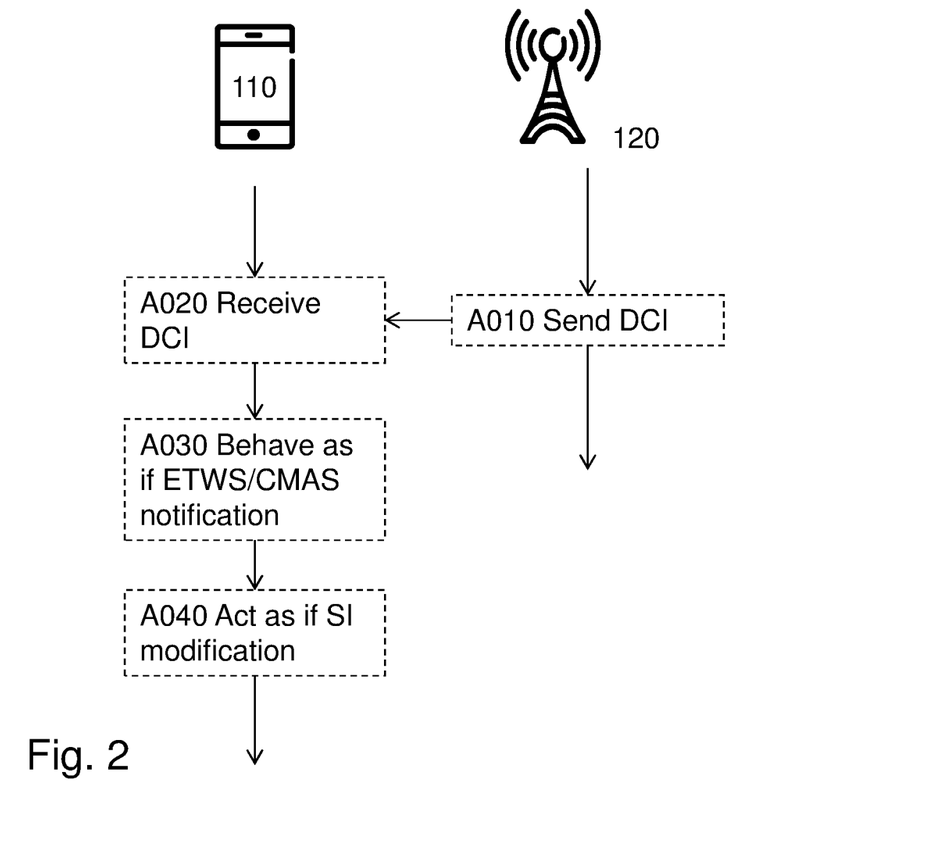
FIG. 2 is a combined signaling and flowchart illustrating the methods herein.

FIG. 2 illustrates an exemplifying method according to embodiments herein when implemented in the wireless communication system 100 of FIG. 1.

The use requipment 110 operates on a carrier configured for multimedia broadcast multicast services, such as MBMS, eMBMS, FeMBMS or the like. The radio network node 120 thus manages the carrier configured for multimedia broadcast multicast services.

One or more of the following actions may be performed in any suitable order.

Action A010

In order to inform the user equipment 110 of whether or not to attempt to find emergency notifications, the radio network node 120 sends, on a physical downlink control channel of the carrier, downlink control information using a multicast network identifier. The downlink control information comprises a bit indicating whether or not at least two emergency notifications are broadcast on the carrier, and a notification relating to a change of a multicast channel of the carrier. Said at least two emergency notifications may comprise an ETWS notification and a CMAS notification.

Thereby, the radio network node 120 instructs the user equipment 110 to, when the bit is set to one, behave as if at least two fields relating to indication of said at least two emergency notifications are set to one in a paging message for the user equipment 110.

The downlink control information may comprise a further bit indicating whether or not modification of system information of the carrier is broadcast on the carrier.

Thereby, the radio network node 120 instructs the user equipment 110 to, when the further bit is set to one, act as if a field relating to modification of the system information is set in the paging message.

The further bit may be a least significant bit of the downlink control information and the bit may be a second but least significant bit of the downlink control information. The expression "second but least significant bit" may refer to that the bit may be the second bit taken in order from the least significant bit, e.g. from the right.

In some examples, e.g. when the radio network node 120 is implemented in a cloud system or the like, the radio network node 120 initiates the sending of the downlink control information.

Action A020

Subsequent to action A0101, the user equipment 110 receives, on a physical downlink control channel of the carrier, downlink control information using a multicast network identifier, such as M-RNTI or the like. The downlink control information, such as DCI, comprises a bit indicating whether or not at least two emergency notifications are broadcast on the carrier, and a notification relating to a change of a multicast channel of the carrier.

The physical downlink control channel may be PDCCH or the like.

As mentioned, said at least two emergency notifications may comprise an ETWS notification and a CMAS notification. The downlink control information may comprise a further bit indicating whether or not modification of system information of the carrier is broadcast on the carrier. The further bit may be a least significant bit of the downlink control information and the bit may be a second but least significant bit of the downlink control information.

Action A030

The user equipment 110 behaves as if at least two fields relating to indication of said at least two emergency notifications are set to one in a paging message for the user equipment 110, when the bit is set to one.

The behaving A030 may comprise searching, in the carrier, for said at least two emergency notifications.

The paging message may be associated with resources on PDSCH of the carrier, which resources are indicated by a DCI encoded with P-RNTI on PDCCH of the carrier.

Action A040

The user equipment 110 may act as if a field relating to modification of the system information is set in the paging message, when the further bit is set to one.

The acting A040 may comprise searching, in the carrier, for a message comprising information about the modification of the system information.

The change of system information for ETWS and CMAS is handled differently than the rest of the SI supported on dedicated feMBMS carrier. In TS36.331 Section 5.2.1.3 it is described that:

Change of system information (other than for ETWS, CMAS and EAB parameters and other than for AB parameters for NB-IoT) only occurs at specific radio frames, i.e. the concept of a modification period is used.

This means that both ETWS and CMAS can change at any time regardless of the SI modification boundary, and the other SI on MBMS carrier only at next modification boundary. Further, the procedures for acquiring ETWS or CMAS are similar as described in TS36.331 in Sections 5.2.1.4 and 5.2.1.5, respectively. When the UE receives Paging message indicating ETWS or CMAS indication, or the corresponding bits are set to 1 for the Direct Indication Information (see Section 6.6), UE shall start receiving ETWS or CMAS notifications according to schedulingInfoList.

Due to the bandwidth limitation of DCI format 1-C and the different handling of SI versus ETWS and CMAS notifications, one bit should indicate SI change and ETWS or CMAS notification should be signaled with a common bit.

The UE procedure would be such that if UE receives this one bit for SI change notification, it would act as if it has received Paging message including the systemInfoModification (applies the SI message periodicity as currently). If the common bit for ETWS/CMAS is set to 1, UE acts as if Paging message including both ETWS and CMAS notifications has been received and starts receiving ETWS and CMAS notifications according to schedulingInfoList. That is, UE checks for all SIB10, SIB11 and SIB12. Thus, even if bandwidths larger than 15PRBs could accommodate separate bits for ETWS and CMAS it is preferred to specify single notification format and UE procedure.

The bits for SI notification and ETWS/CMAS may be conditionally or mandatory present in DCI format 10 specified in TS36.312.

As an example of relating to Direct Indication Information, the Direct Indication information is transmitted on MPDCCH using P-RNTI but without associated Paging message. Table 6.6-1 defines the Direct Indication information, see TS 36.212 [22, 5.3.3.1.14].

When bit n is set to 1, UE shall behave as if the corresponding field is set in the Paging message, see 5.3.2.3. Bit 1 is the least significant bit.

TABLE 6.6-1

Direct Indication information

| Bit | Direct Indication information |
|---|---|
| 1 | systemInfoModification |
| 2 | etws-Indication |
| 3 | cmas-Indication |
| 4 | eab-ParamModification |
| 5 | systemInfoModification-eDRX |
| 6, 7, 8 | Not used, and shall be ignored by UE if received. |

As an example of Direct Indication feMBMS:

On dedicated MBMS carrier, a Direct Indication feMBMS is transmitted on PDCCH together with 8-bit MCCH change notification using M-RNTI, see TS 36.212 [22, 5.3.3.1.4]. Table 6.6x-1 defines the Direct Indication feMBMS.

When the first bit is set to 1, UE shall behave as if systemInfoModification field is set in the Paging message and when the second bit is set to 1, UE shall behave as if both etws-Indication and cmas-Indication are set in the Paging message, see 5.3.2.3. Bit 1 is the least significant bit.

TABLE 6.6-1

Direct Indication feMBMS

| Bit | Direct Indication feMBMS |
|---|---|
| 1 | systemInfoModification |
| 2 | etws-Indication and cmas-Indication |

Figure 3:
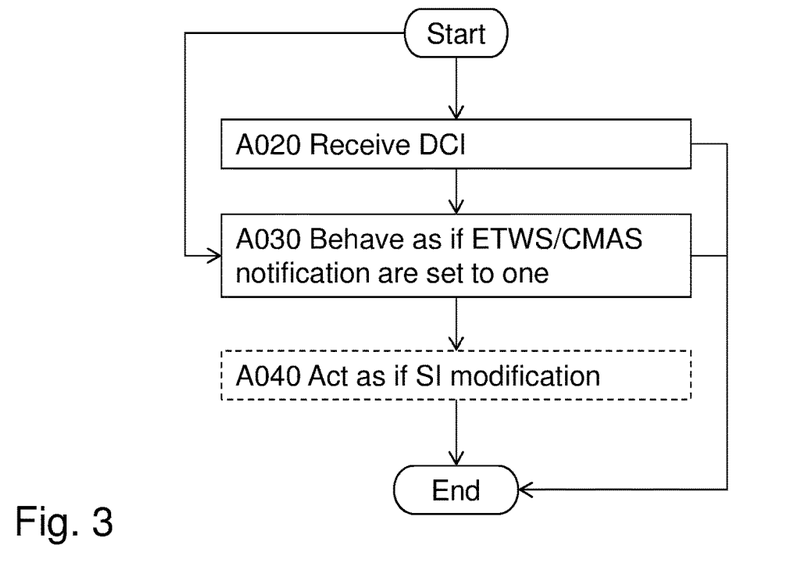
FIG. 3 is a flowchart illustrating embodiments of the method in the user equipment.

In FIG. 3, a schematic flowchart of exemplifying methods in the user equipment 110 is shown. Again, the same reference numerals as above have been used to denote the same or similar features, in particular the same reference numerals have been used to denote the same or similar actions. The user equipment 110 operates on a carrier configured for multimedia broadcast multicast services, such as MBMS, eMBMS, feMBMS or the like.

One or more of the following actions may be performed in any suitable order.

Action A020

The user equipment 110 receives, on a physical downlink control channel of the carrier, downlink control information using a multicast network identifier, such as M-RNTI or the like.

The downlink control information, such as DCI, comprises a bit indicating whether or not at least two emergency notifications are broadcast on the carrier, and a notification relating to a change of a multicast channel of the carrier.

The physical downlink control channel may be PDCCH or the like.

As mentioned, said at least two emergency notifications may comprise an ETWS notification and a CMAS notification. The downlink control information may comprise a further bit indicating whether or not modification of system information of the carrier is broadcast on the carrier. The further bit may be a least significant bit of the downlink control information and the bit may be a second but least significant bit of the downlink control information.

Action A030

The user equipment 110 behaves as if at least two fields relating to indication of said at least two emergency notifications are set to one in a paging message for the user equipment 110, when the bit is set to one.

The behaving A030 may comprise searching, in the carrier, for said at least two emergency notifications.

The paging message may be associated with resources on PDSCH of the carrier, which resources are indicated by a DCI encoded with P-RNTI on PDCCH of the carrier.

Action A040

The user equipment 110 may act as if a field relating to modification of the system information is set in the paging message, when the further bit is set to one.

The acting A040 may comprise searching, in the carrier, for a message comprising information about the modification of the system information.

Figure 4:
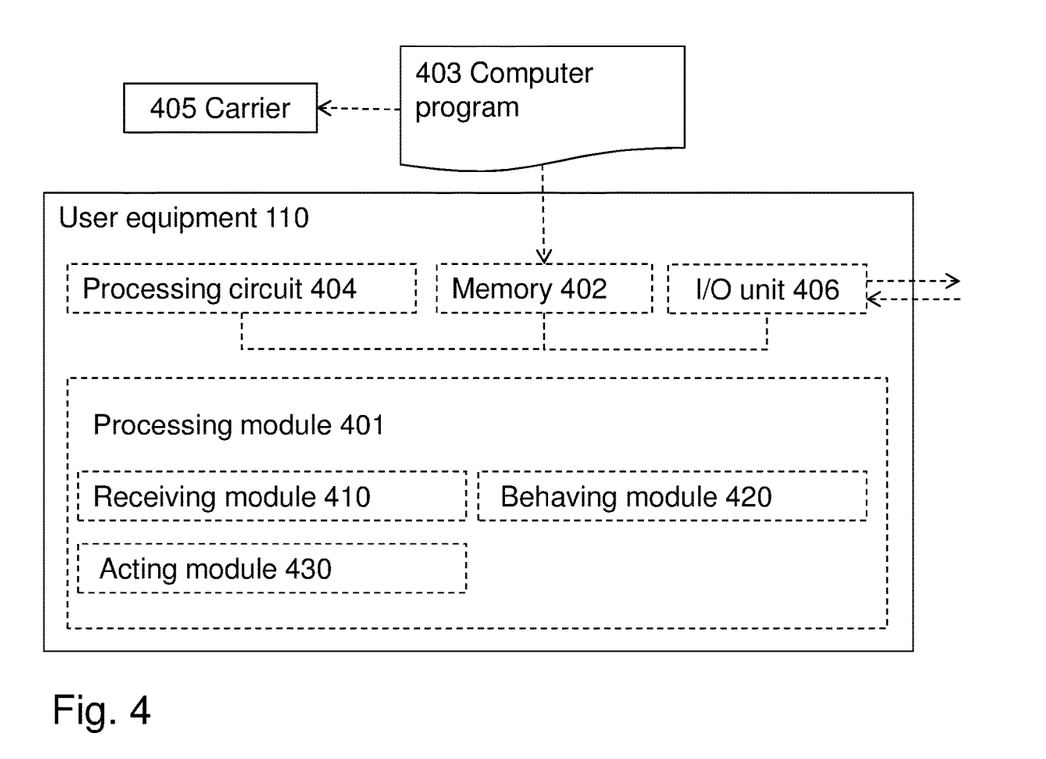
FIG. 4 is a block diagram illustrating embodiments of the user equipment.

With reference to FIG. 4, a schematic block diagram of embodiments of the user equipment 110 of FIG. 1 is shown.

The user equipment 110 may comprise a processing module 401, such as a means for performing the methods described herein. The means may be embodied in the form of one or more hardware modules and/or one or more software modules The user equipment 110 may further comprise a memory 402. The memory may comprise, such as contain or store, instructions, e.g. in the form of a computer program 403, which may comprise computer readable code units.

According to some embodiments herein, the user equipment 110 and/or the processing module 401 comprises a processing circuit 404 as an exemplifying hardware module, which may comprise one or more processors. Accordingly, the processing module 401 may be embodied in the form of, or 'realized by', the processing circuit 404. The instructions may be executable by the processing circuit 404, whereby the user equipment 110 is operative to perform the methods of FIG. 2 and/or FIG. 3. As another example, the instructions, when executed by the user equipment 110 and/or the processing circuit 404, may cause the user equipment 110 to perform the method according to FIG. 2 and/or 3.

In view of the above, in one example, there is provided a user equipment 110 that operates on a carrier configured for multimedia broadcast multicast services. Again, the memory 402 contains the instructions executable by said processing circuit 404 whereby the user equipment 110 is operative for:

receiving, on a physical downlink control channel of the carrier, downlink control information using a multicast network identifier, wherein the downlink control information comprises a bit indicating whether or not at least two emergency notifications are broadcast on the carrier, and a notification relating to a change of a multicast channel of the carrier, and behaving as if at least two fields relating to indication of said at least two emergency notifications are set to one in a paging message for the user equipment 110, when the bit is set to one.

FIG. 4 further illustrates a carrier 405, or program carrier, which comprises the computer program 403 as described directly above.

In some embodiments, the user equipment 110 and/or the processing module 401 may comprise one or more of a receiving module 410, a behaving module 420, and an acting module 430 as exemplifying hardware modules, such as circuits or the like. In other examples, one or more of the aforementioned exemplifying hardware modules may be implemented as one or more software modules.

Moreover, the processing module 401 comprises an Input/Output unit 406, which may be exemplified by the receiving module and/or a sending module when applicable.

Accordingly, the user equipment 110 is configured for operation on a carrier configured for multimedia broadcast multicast services.

Therefore, according to the various embodiments described above, the user equipment 110 and/or the processing module 401 and/or the receiving module 410 is configured for receiving, on a physical downlink control channel of the carrier, downlink control information using a multicast network identifier. The downlink control information comprises a bit indicating whether or not at least two emergency notifications are broadcast on the carrier, and a notification relating to a change of a multicast channel of the carrier.

The user equipment 110 and/or the processing module 401 and/or the behaving module 420 is configured for behaving as if at least two fields relating to indication of said at least two emergency notifications are set to one in a paging message for the user equipment 110, when the bit is set to one.

As mentioned, said at least two emergency notifications may comprise an ETWS notification and a CMAS notification. The downlink control information may comprise a further bit indicating whether or not modification of system information of the carrier is broadcast on the carrier. The further bit may be a least significant bit of the downlink control information and the bit may be a second but least significant bit of the downlink control information.

The user equipment 110 and/or the processing module 401 and/or an acting module 430 may be configured for acting as if a field relating to modification of the system information is set in the paging message, when the further bit is set to one.

The user equipment 110 and/or the processing module 401 and/or the acting module 430 may be configured for acting as if the field relating to modification of the system information is set in the paging message by searching, in the carrier, for a message comprising information about the modification of the system information.

The user equipment 110 and/or the processing module 401 and/or the behaving module 420 may be configured for behaving as if at least two fields relating to indication of said at least two emergency notifications are set to one in the paging message by searching, in the carrier, for said at least two emergency notifications.

Figure 5:
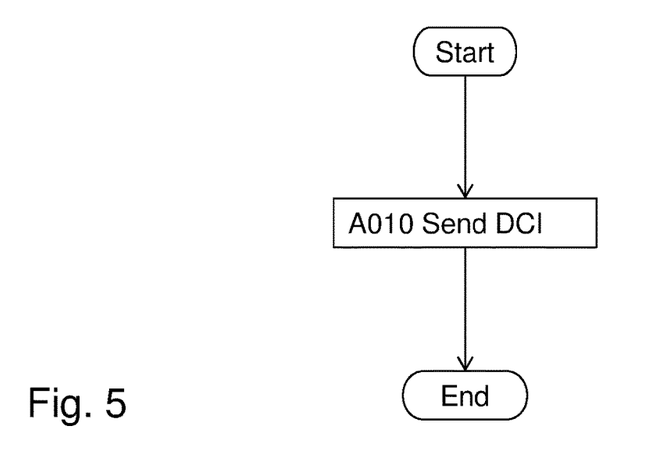
FIG. 5 is a flowchart illustrating embodiments of the method in the radio network node.

In FIG. 5, a schematic flowchart of exemplifying methods in the radio network node 120 is shown. Again, the same reference numerals as above have been used to denote the same or similar features, in particular the same reference numerals have been used to denote the same or similar actions.

The radio network node 120 manages a carrier configured for multimedia broadcast multicast services.

The following action may be performed.

Action A010

The radio network node 120 sends, on a physical downlink control channel of the carrier, downlink control information using a multicast network identifier. The downlink control information comprises a bit indicating whether or not at least two emergency notifications are broadcast on the carrier, and a notification relating to a change of a multicast channel of the carrier. Said at least two emergency notifications may comprise an ETWS notification and a CMAS notification.

Thereby, the radio network node 120 instructs the user equipment 110 to, when the bit is set to one, behave as if at least two fields relating to indication of said at least two emergency notifications are set to one in a paging message for the user equipment 110.

The downlink control information may comprise a further bit indicating whether or not modification of system information of the carrier is broadcast on the carrier.

Thereby, the radio network node 120 instructs the user equipment 110 to, when the further bit is set to one, act as if a field relating to modification of the system information is set in the paging message.

The further bit may be a least significant bit of the downlink control information and the bit may be a second but least significant bit of the downlink control information.

Figure 6:
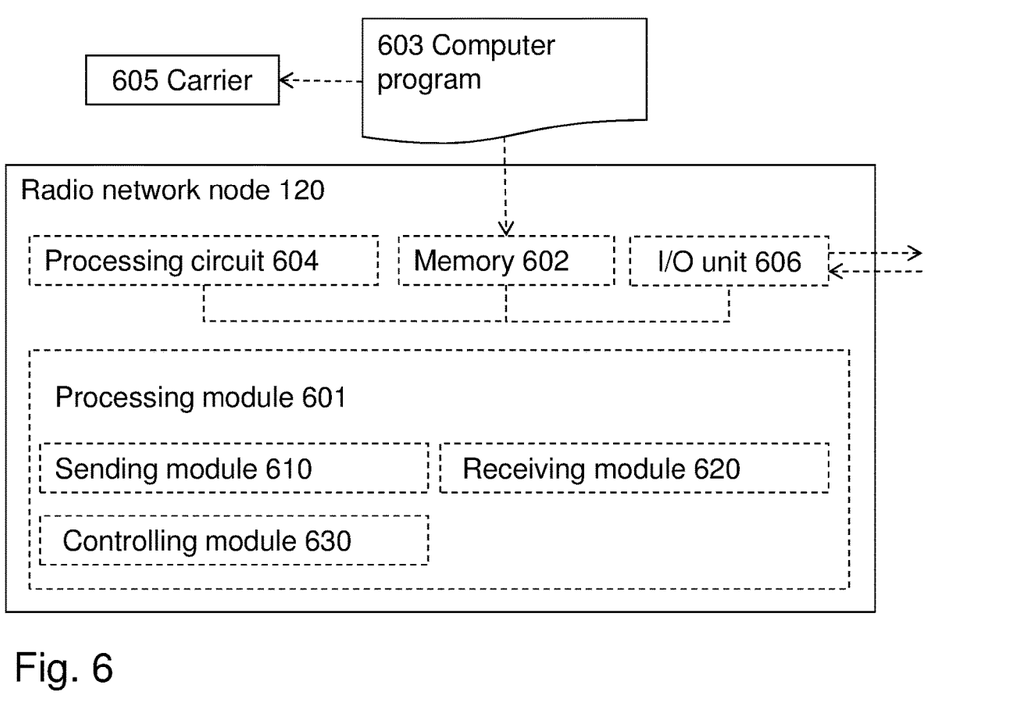
FIG. 6 is a block diagram illustrating embodiments of the radio network node.

With reference to FIG. 6, a schematic block diagram of embodiments of the radio network node 120 of FIG. 1 is shown.

The radio network node 120 may comprise a processing module 601, such as a means for performing the methods described herein. The means may be embodied in the form of one or more hardware modules and/or one or more software modules The radio network node 120 may further comprise a memory 602. The memory may comprise, such as contain or store, instructions, e.g. in the form of a computer program 603, which may comprise computer readable code units.

According to some embodiments herein, the radio network node 120 and/or the processing module 601 comprises a processing circuit 604 as an exemplifying hardware module. Accordingly, the processing module 601 may be embodied in the form of, or 'realized by', the processing circuit 604. The instructions may be executable by the processing circuit 604, whereby the radio network node 120 is operative to perform the methods of FIG. 2 and/or FIG. 5. As another example, the instructions, when executed by the radio network node 120 and/or the processing circuit 604, may cause the radio network node 120 to perform the method according to FIG. 2 and/or FIG. 5.

In view of the above, in one example, there is provided a radio network node 120 that manages a carrier configured for multimedia broadcast multicast services. Again, the memory 602 contains the instructions executable by said processing circuit 604 whereby the radio network node 120 is operative for:

sending, on a physical downlink control channel of the carrier, downlink control information using a multicast network identifier, wherein the downlink control information comprises a bit indicating whether or not at least two emergency notifications are broadcast on the carrier, and a notification relating to a change of a multicast channel of the carrier.

FIG. 6 further illustrates a carrier 605, or program carrier, which comprises the computer program 603 as described directly above.

In some embodiments, the processing module 601 comprises an Input/Output unit 606, which may be exemplified by a receiving module and/or a sending module when applicable.

In further embodiments, the radio network node 120 and/or the processing module 601 may comprise one or more of a sending module 610, a receiving module 620 and a controlling module 630 as exemplifying hardware modules, such as circuits or the like. In other examples, one or more of the aforementioned exemplifying hardware modules may be implemented as one or more software modules.

Accordingly, the radio network node 120 is configured for managing a carrier configured for multimedia broadcast multicast services.

Therefore, according to the various embodiments described above, the radio network node 120 and/or the processing module 601 and/or the sending module 610 is configured for sending, on a physical downlink control channel of the carrier, downlink control information using a multicast network identifier. The downlink control information comprises a bit indicating whether or not at least two emergency notifications are broadcast on the carrier, and a notification relating to a change of a multicast channel of the carrier.

As mentioned, said at least two emergency notifications may comprise an ETWS notification and a CMAS notification. The downlink control information may comprise a further bit indicating whether or not modification of system information of the carrier is broadcast on the carrier. The further bit may be a least significant bit of the downlink control information and the bit may be a second but least significant bit of the downlink control information.

As used herein, the term "node", or "network node", may refer to one or more physical entities, such as devices, apparatuses, computers, servers or the like. This may mean that embodiments herein may be implemented in one physical entity. Alternatively, the embodiments herein may be implemented in a plurality of physical entities, such as an arrangement comprising said one or more physical entities, i.e. the embodiments may be implemented in a distributed manner, such as on a set of server machines of a cloud system.

As used herein, the term "module" may refer to one or more functional modules, each of which may be implemented as one or more hardware modules and/or one or more software modules and/or a combined software/hardware module in a node. In some examples, the module may represent a functional unit realized as software and/or hardware of the node.

As used herein, the term "computer program carrier", "program carrier", or "carrier", may refer to one of an electronic signal, an optical signal, a radio signal, and a computer readable medium. In some examples, the computer program carrier may exclude transitory, propagating signals, such as the electronic, optical and/or radio signal. Thus, in these examples, the computer program carrier may be a non-transitory carrier, such as a non-transitory computer readable medium.

As used herein, the term "processing module" may include one or more hardware modules, one or more software modules or a combination thereof. Any such module, be it a hardware, software or a combined hardware-software module, may be a determining means, estimating means, capturing means, associating means, comparing means, identification means, selecting means, receiving means, sending means or the like as disclosed herein. As an example, the expression "means" may be a module corresponding to the modules listed above in conjunction with the Figures.

As used herein, the term "software module" may refer to a software application, a Dynamic Link Library (DLL), a software component, a software object, an object according to Component Object Model (COM), a software component, a software function, a software engine, an executable binary software file or the like.

The terms "processing module" or "processing circuit" may herein encompass a processing unit, comprising e.g. one or more processors, an Application Specific integrated Circuit (ASIC), a Field-Programmable Gate Array (FPGA) or the like. The processing circuit or the like may comprise one or more processor kernels.

As used herein, the expression "configured to/for" may mean that a processing circuit is configured to, such as adapted to or operative to, by means of software configuration and/or hardware configuration, perform one or more of the actions described herein.

As used herein, the term "action" may refer to an action, a step, an operation, a response, a reaction, an activity or the like. It shall be noted that an action herein may be split into two or more sub-actions as applicable. Moreover, also as applicable, it shall be noted that two or more of the actions described herein may be merged into a single action.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), Secure Digital (SD) card, etc. One or more of the aforementioned examples of computer readable medium may be provided as one or more computer program products.

As used herein, the term "computer readable code units" may be text of a computer program, parts of or an entire binary file representing a computer program in a compiled format or anything there between.

As used herein, the expression "transmit" and "send" are considered to be interchangeable. These expressions include transmission by broadcasting, uni-casting, group-casting and the like. In this context, a transmission by broadcasting may be received and decoded by any authorized device within range. In case of uni-casting, one specifically addressed device may receive and decode the transmission. In case of group-casting, a group of specifically addressed devices may receive and decode the transmission.

As used herein, the terms "number" and/or "value" may be any kind of digit, such as binary, real, imaginary or rational number or the like. Moreover, "number" and/or "value" may be one or more characters, such as a letter or a string of letters. "Number" and/or "value" may also be represented by a string of bits, i.e. zeros and/or ones.

As used herein, the term "set of" may refer to one or more of something. E.g. a set of devices may refer to one or more devices, a set of parameters may refer to one or more parameters or the like according to the embodiments herein.

As used herein, the expression "in some embodiments" has been used to indicate that the features of the embodiment described may be combined with any other embodiment disclosed herein.

Further, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation. The common abbreviation "etc.", which derives from the Latin expression "et cetera" meaning "and other things" or "and so on" may have been used herein to indicate that further features, similar to the ones that have just been enumerated, exist.

Even though embodiments of the various aspects have been described, many different alterations, modifications and the like thereof will become apparent for those skilled in the art. The described embodiments are therefore not intended to limit the scope of the present disclosure.

The invention claimed is:

1. A method performed by a user equipment, wherein the user equipment operates on a carrier configured for multimedia broadcast multicast services, the method comprising:
    receiving downlink control information (DCI) transmitted over a physical downlink control channel (PDCCH), wherein the downlink control information comprises i) information indicating whether or not at least two emergency notifications are broadcast on the carrier and ii) a notification relating to a change of a multicast channel of the carrier;
    determining whether the information satisfies a condition; and
    as a result of determining that the information satisfies the condition, behaving as if at least two fields relating to indication of said at least two emergency notifications are set to one in a paging message for the user equipment.

2. The method of claim 1, wherein said at least two emergency notifications comprises an Earthquake and Tsunami Warning System (ETWS) notification and a Commercial Mobile Alert System (CMAS) notification.

3. The method of claim 1, wherein
    the information consists of a bit, and
    the bit is a second but least significant bit of the downlink control information.

4. The method of claim 1, wherein the behaving comprises searching, in the carrier, for said at least two emergency notifications.

5. A method, performed by a radio network node, wherein the radio network node manages a carrier configured for multimedia broadcast multicast services, the method comprising:
    sending downlink control information (DCI) over a physical downlink control channel (PDCCH), wherein the downlink control information comprises i) information indicating whether or not at least two emergency notifications are broadcast on the carrier and ii) notification relating to a change of a multicast channel of the carrier.

6. The method of claim 5, wherein said at least two emergency notifications comprises an Earthquake and Tsunami Warning System (ETWS) notification and a Commercial Mobile Alert System (CMAS) notification.

7. The method of claim 5, wherein
    the information consists of a bit, and
    the bit is a second but least significant bit of the downlink control information.

8. A user equipment is configured for operation on a carrier configured for multimedia broadcast multicast services, wherein the user equipment is configured for:
    receiving downlink control information (DCI) transmitted over a physical downlink control channel (PDCCH), wherein the downlink control information comprises i) information indicating whether or not at least two emergency notifications are broadcast on the carrier and ii) a notification relating to a change of a multicast channel of the carrier;
    determining whether the information satisfies a condition; and
    as a result of determining that the information satisfies the condition, behaving as if at least two fields relating to indication of said at least two emergency notifications are set to one in a paging message for the user equipment.

9. The user equipment of claim 8, wherein said at least two emergency notifications comprises an Earthquake and Tsunami Warning System (ETWS) notification and a Commercial Mobile Alert System (CMAS) notification.

10. The user equipment of claim 8, wherein
    the information consists of a bit, and
    the bit is a second but least significant bit of the downlink control information.

11. The user equipment of claim 8, wherein the user equipment is configured for behaving as if at least two fields relating to indication of said at least two emergency notifications are set to one in the paging message by searching, in the carrier, for said at least two emergency notifications.

12. A radio network node is configured for managing a carrier configured for multimedia broadcast multicast services, wherein the radio network node is configured for:
    sending downlink control information (DCI) over a physical downlink control channel (PDCCH), wherein the downlink control information comprises i) information indicating whether or not at least two emergency notifications are broadcast on the carrier and ii) notification relating to a change of a multicast channel of the carrier.

13. The radio network node of claim 12, wherein said at least two emergency notifications comprises an Earthquake and Tsunami Warning System (ETWS) notification and a Commercial Mobile Alert System (CMAS) notification.

14. The radio network node of claim 12, wherein
    the information consists of a bit, and
    the bit is a second but least significant bit of the downlink control information.

15. A computer program product comprising a non-transitory computer readable medium storing a computer program, comprising computer readable code units which when executed on a user equipment causes the user equipment to:
    receive downlink control information (DCI) transmitted over a physical downlink control channel (PDCCH), wherein the downlink control information comprises i)

information indicating whether or not at least two emergency notifications are broadcast on a carrier configured for multimedia broadcast multicast services and ii) a notification relating to a change of a multicast channel of the carrier;

determine whether the information satisfies a condition; and as a result of determining that the information satisfies the condition, behave as if at least two fields relating to indication of said at least two emergency notifications are set to one in a paging message for the user equipment.

16. A computer program product comprising a non-transitory computer readable medium storing a computer program, comprising computer readable code units which when executed on a radio network node causes the radio network node to:

send downlink control information (DCI) over a physical downlink control channel (PDCCH), wherein the downlink control information comprises i) information indicating whether or not at least two emergency notifications are broadcast on a carrier configured for multimedia broadcast multicast services and ii) notification relating to a change of a multicast channel of the carrier.

17. The method of claim 1, wherein the information consists of a bit, and determining whether the information satisfies a condition comprises determining whether the bit is set to 1.

* * * * *